US012727589B1

(12) United States Patent
Shemesh et al.

(10) Patent No.: US 12,727,589 B1
(45) Date of Patent: Sep. 8, 2026

(54) FISHING LURE, ASSEMBLY AND RELATED METHOD

(71) Applicant: Wolfpack Tackle, Inc, Warminster, PA (US)

(72) Inventors: Ilan Shemesh, Warminster, PA (US); Jeff Warford, Warminster, PA (US)

(73) Assignee: Wolfpack Tackle, Inc, Warminster, PA (US)

( * ) Notice: Subject to any disclaimer, the term of this patent is extended or adjusted under 35 U.S.C. 154(b) by 0 days.

(21) Appl. No.: 19/349,342

(22) Filed: Oct. 3, 2025

(51) Int. Cl.
*A01K 85/00* (2006.01)
*A01K 91/14* (2006.01)

(52) U.S. Cl.
CPC ........ *A01K 85/1823* (2022.02); *A01K 85/029* (2022.02); *A01K 85/1837* (2022.02); *A01K 85/1851* (2022.02); *A01K 91/14* (2013.01)

(58) Field of Classification Search
CPC ..... A01K 85/1851; A01K 91/08; A01K 83/06
See application file for complete search history.

(56) References Cited

U.S. PATENT DOCUMENTS 5,177,895 A * 1/1993 Baron .................... A01K 83/06 43/44.2
5,329,720 A * 7/1994 Baron .................... A01K 85/00 43/44.2
5,778,593 A * 7/1998 Baron .................... A01K 85/00 43/44.4
6,658,785 B1 * 12/2003 Faulkner ................ A01K 83/06 43/44.2
11,330,808 B2 * 5/2022 Plihal ..................... A01K 85/18
2011/0185622 A1 * 8/2011 Somogyi ................ A01K 85/01 43/42.22
2019/0297864 A1 * 10/2019 League .................. A01K 83/06
2023/0337648 A1 10/2023 Shemesh et al.
2024/0099286 A1 * 3/2024 Agyik .................... A01K 83/06
2024/0373833 A1 * 11/2024 Eaton ................... A01K 85/011
2025/0386813 A1 * 12/2025 Nitsche ............. A01K 85/1811

OTHER PUBLICATIONS

"Hoonose Ballyhoo Rigs 12pk" <www.captharry.com/products/hoonose-ballyhoo-rigs-12pk>—Jun. 11, 2025.
"Saltwater Trolling Lure with Free Ballyhoo Rig included for Mahi Mahi Dolphin Dorado Wahoo Marlin Tuna Offshore Big Games Lures" <www.amazon.com/saltwater-trolling-Offshore-included-Dolphin>/dp/bobt2132py.

* cited by examiner

*Primary Examiner* — Christopher P Ellis
(74) *Attorney, Agent, or Firm* — Patterson + Sheridan, LLP

(57) ABSTRACT

Fishing lures and accessories for fishing lures are described herein that enable a rigged a baitfish, such as a ballyhoo, to swim in a natural fashion when trolled from a sportfishing vessel. In one example, a fishing lure is provided that includes a central body having an elastomeric cover. The central body includes front and main regions. A notch is formed in a top surface of the central body. A hole is formed in the central body and passes through an aft end of the main region. The notch is open to the hole. The cover is formed from an elastomer and includes a tab extending into the notch. A first leader passage is formed through the tab. The first leader passage exits a top exterior surface of the cover and the tab. The first leader passage is open to the hole formed in the central body.

18 Claims, 9 Drawing Sheets

Y
X
816
806
1300
834
804
802
1302
902
904
818
832
520
514
504
512
508
1318
530
1338
1350
Z
1102
506

FISHING LURE, ASSEMBLY AND RELATED METHOD

FIELD OF THE INVENTION

This invention generally relates to fishing lure used primarily for trolling and catching pelagic gamefish such as dolphin, tuna, wahoo, marlin, and the like. The lure is particularly suitable for rigging a ballyhoo, among other types of baitfish, to create a presentation that mimics a swimming baitfish. The lure generally includes a body and cover, the cover having a leader passage that is protected from the body.

BACKGROUND

There are many types of fishing rigs and lures available that utilize a wide variety of techniques for rigging baitfish, such as ballyhoo, when targeting pelagic gamefish such as dolphin, tuna, wahoo, marlin, and the like. However, properly rigging a ballyhoo is difficult because the bait itself is delicate, and requires a multi-step process to make the bait appear to swim naturally while being able to withstand the stress of being trolled through the water. A poorly rigged ballyhoo will spin or not "swim" correctly, and pelagic fish will frustratingly not strike. The difficulty stems from the need for perfect bait preparation and flawless technique. While rigging a perfectly swimming ballyhoo can be repeatably performed by top fishing crews, most sportsmen do not have the time to effectively master the technique, particularly when performed on a moving vessel.

Some techniques for improving the probability that a bait swims correctly include chin-weighting or using a split-bill rigging technique. Chin-weighting refers to the addition of a small egg sinker below the head of the ballyhoo. While adding weight to the bottom of the bait helps maintain the bait in a natural upright orientation, the complexity of securing the sinker to the bait adds to the skill required to create the desired swimming action.

The split-bill technique refers to running the leader between a split created in the ballyhoo's bill. This results in the leader exiting the bait in an upward angle, thus creating a lip similar to a swimming plug. The lip not only enhances the swimming action, but makes the bait much less likely to spin. However, rigging a split-bill ballyhoo is even more difficult then chin-weighting, making its use much less popular despite the enhanced swimming action.

Thus, there is a need for an improved lure for rigging baitfish, along with techniques for accomplishing the same.

BRIEF SUMMARY OF THE INVENTION

Fishing lures and accessories for fishing lures are described herein that enable a rigged a bait fish, such as a ballyhoo, to swim in a natural fashion when trolled from a sportfishing vessel. In one example, a fishing lure is provided that includes a central body having an elastomeric cover. The central body includes front and main regions. A notch is formed in a top surface of the central body. A hole is disposed in the central body and passes through an aft end of the main region. The notch is open to the hole. The cover is formed from an elastomer and includes a tab extending into the notch formed in the central body. A first leader passage is formed through the tab. The first leader passage exits a top exterior surface of the cover. The first leader passage exists a bottom surface of the tab and is open to the hole formed in the central body.

In another example, the first leader passage forms an angle greater than zero degrees and less than or equal to 90 degrees relative to a centerline of the hole formed in the central body. In another example, the first leader passage forms an angle of between 15 degrees and 75 degrees relative to a centerline of the hole formed in the central body.

In another example, a second leader passage is formed through the tab. The second leader passage exits the top exterior surface of the cover and the tab. The second leader passage is open to the hole formed in the central body. The second leader passage is disposed at an angle greater than zero degrees and less than or equal to 90 degrees relative to the centerline of the hole formed in the central body.

In another example, the cover includes a center hole formed in a front of the cover that is open to the hole formed in the central body via a leader hole formed in a front section of the central body.

In another example, the head of the is keel weighted. The head of the lure may be fabricated from stainless steel, brass, lead or tungsten.

In another example, the lure includes an extension extending from an aft end of the main region. The hole in the central body extends through the extensions.

In some examples, accessories may be connected to the central body. The accessories and the central body may include mating key structures that only allow the accessories to be coupled to the central body in one or more defined orientations. The accessories include one or both of a bait stabilizer and skirt disposed around the extension. The stabilizer may optionally include a strap for securing a baitfish to the stabilizer.

The stabilizer may be provided as a novel, independent structure that can be obtained with or without a lure head.

In other embodiments accessories for fishing lures are described herein. The accessories are configured to be removably affixed to a fishing lure. Some non-limiting examples of accessories that may be removably affixed to a fishing lure include bait stabilizers and skirts.

In one example, a bait stabilizer is provided that includes a body having a front portion and a rear portion. The body includes a baitfish receiving cavity formed in the rear portion of the body, a hole extending through the front and rear portions of the body, a strap coupled to a first side of the body; and a catch coupled to a second side of the body that is opposite the first side of the body. The baitfish receiving cavity has a centerline. The hole extending is open to the baitfish receiving cavity and has a diameter selected to allow a leader to freely slide therethrough. The catch is operable to secure the strap to the body of the bait stabilizer.

In some examples, a centerline of the front portion and the centerline of the bait receiving cavity are disposed at an angle less than 90 degrees but greater than 0 degrees.

In another example, a bait stabilizer is provided that includes a body having a front portion and a rear portion. The body is fabricated from a polymeric material and includes a baitfish receiving cavity, a hole, a slot, a flexible strap, and a catch. The baitfish receiving cavity is formed in the rear portion of the body and has a centerline. The hole extends through the front and rear portions of the body. The hole is open to the baitfish receiving cavity and has a diameter selected to allow a leader to freely slide therethrough. The slot extends between the strap and the catch. The slot intersects the hole extending through the body. The flexible strap is coupled to a first side of the body proximate a first end of the slot. The catch is coupled to a second side of the body proximate a second end of the slot. The catch is operable to secure the strap to the body of the bait stabilizer.

In other embodiments accessories for fishing lures are described herein. The accessories are configured to be removably affixed to a fishing lure. Some non-limiting examples of accessories that may be removably affixed to a fishing lure include bait stabilizers and skirts.

In one example, a bait stabilizer is provided that includes a body having a front portion and a rear portion. The body includes a baitfish receiving cavity formed in the rear portion of the body, a hole extending through the front and rear portions of the body, a strap coupled to a first side of the body; and a catch coupled to a second side of the body that is opposite the first side of the body. The baitfish receiving cavity has a centerline. The hole extending is open to the baitfish receiving cavity and has a diameter selected to allow a leader to freely slide therethrough. The catch is operable to secure the strap to the body of the bait stabilizer.

In some examples, a centerline of the front portion and the centerline of the bait receiving cavity are disposed at an angle less than 90 degrees but greater than 0 degrees.

In another example, a bait stabilizer is provided that includes a body having a front portion and a rear portion. The body is fabricated from a polymeric material and includes a baitfish receiving cavity, a hole, a slot, a flexible strap, and a catch. The baitfish receiving cavity is formed in the rear portion of the body and has a centerline. The hole extends through the front and rear portions of the body. The hole is open to the baitfish receiving cavity and has a diameter selected to allow a leader to freely slide therethrough. The slot extends between the strap and the catch. The slot intersects the hole extending through the body. The flexible strap is coupled to a first side of the body proximate a first end of the slot. The catch is coupled to a second side of the body proximate a second end of the slot. The catch is operable to secure the strap to the body of the bait stabilizer.

In yet another example, a fishing lure is provided that includes a hookless central body and a cover disposed over the central body. The central body includes a front region, a main region, an extension, a notch and a hole through the extension and into the main region of the central body. The extension extends into the main region from an aft end of the central body. The notch is formed in a top surface of the central body and is open to the hole. The cover is formed from an elastomer material. The cover has a first leader passage bounded by the elastomer material of the cover. The first leader passage is formed through a top exterior surface of the cover and exits an interior surface of the cover directly into the hole in the central body without passing through a leader hole formed in the central body.

In still another example, a fishing lure is provided that includes a keel weighted central body, a cover, and skirt. The keel weighted central body includes a front region, a main region, an extension extending from an aft end of the central body, and a hole through the extension and into the main region of the central body. The skirt is disposed around the extension. The cover is disposed over the front and main regions of central body. The cover includes tab extending into the notch formed in the central body and a first leader passage formed through the tab at an acute angle relative to a centerline of the hole formed through the extension. The first leader passage has a first opening formed in a top exterior surface of the cover and a second opening in the tab. The second opening is open to the hole formed through the central body. The first opening is closer to a front end of the central body than the second opening.

BRIEF DESCRIPTION OF THE DRAWINGS

The foregoing summary, as well as the following detailed description of a preferred embodiment of the fishing lure, assembly and related method of the present application, will be better understood when read in conjunction with the appended drawings. For the purposes of illustrating the fishing lure, assembly and related method, there is shown in the drawings a preferred embodiment. It should be understood, however, that the application is not limited to the precise arrangements and instrumentalities shown.

To facilitate understanding, identical reference numerals have been used, where possible, to designate identical elements that are common to the figures. It is contemplated that elements of one embodiment may be beneficially incorporated in other embodiments.

DETAILED DESCRIPTION OF THE INVENTION

The present disclosure relates to fishing lures (including rigs) rigs and components thereof that are adapted for presenting bait, such as ballyhoo, in a life-like swimming motion that readily promotes strikes from pelagic gamefish such as dolphin, tuna, wahoo, marlin, and the like. Some of the fishing lures disclosed there includes a leader passage formed though a top surface of a head of a fishing lure. The location of the leader line passage promotes swimming action of the baitfish affixed to the lure, while significantly reducing tendency of the baitfish to spin. Also disclosed herein are various bait stabilizers that may be attached to the fishing lure. The stabilizers are keyed to the head of the lure such that the orientation of the baitfish attached to lure through the stabilizer are maintained in a natural, up-right position. Some stabilizers include straps for quickly and efficiently securing the baitfish to the lure, eliminating the need for rigging floss, copper rigging wire, and pin rigs, while also significantly reducing the associated skill needed to effectively attach the baitfish to the fishing lure in a manner that predictably swims in a natural fashion. Advantageously, the disclosed fishing lure enables the rapid rigging of baitfish that swim in a tournament ready fashion without the need for elaborate rigging materials and tools, or highly skilled mates.

Figure 1:
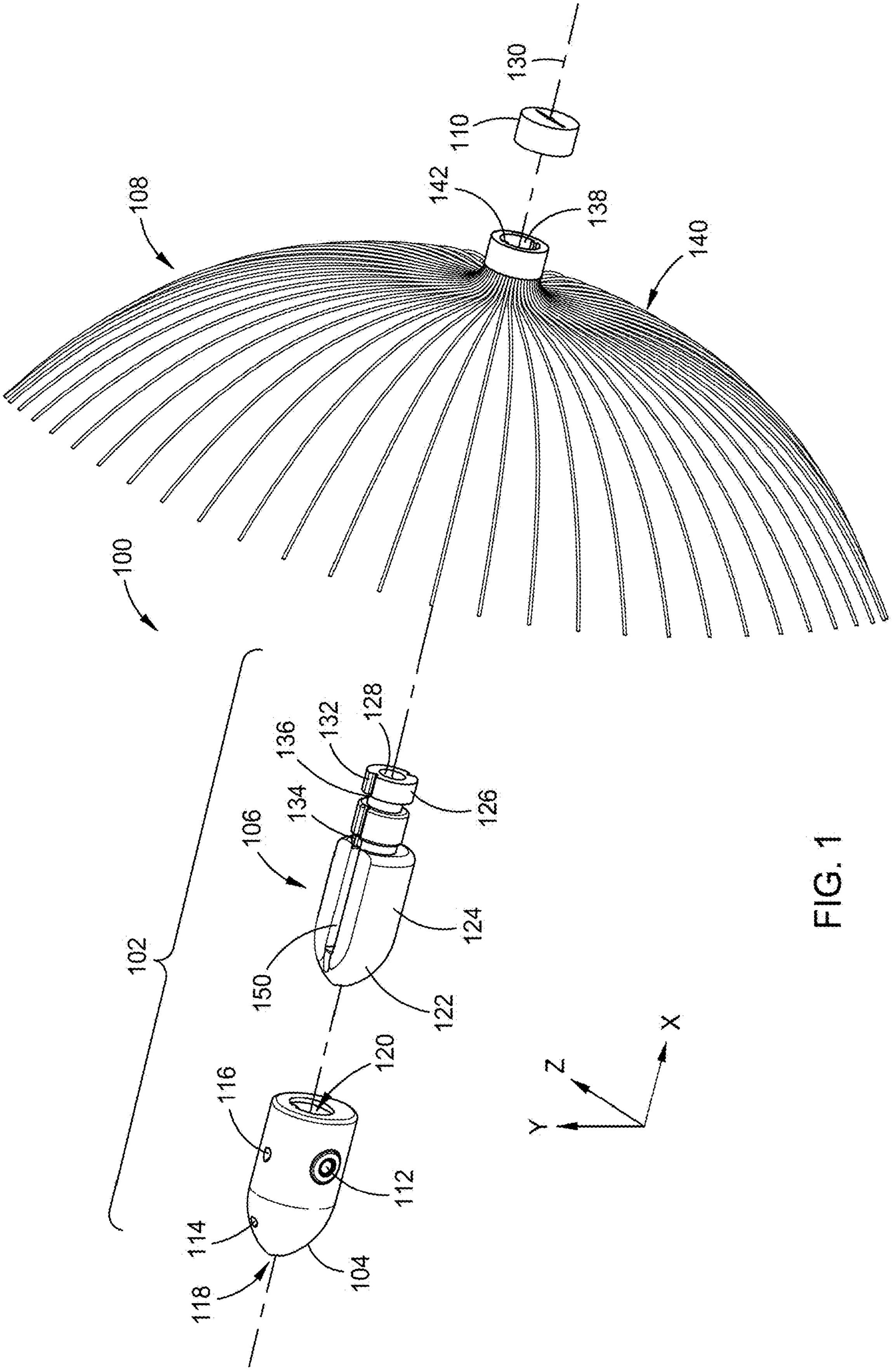
FIG. 1 is an exploded, side perspective view of one example of a fishing lure.

Turning first to FIG. 1, an exploded perspective side view of one example of a fishing lure 100 is provided. The fishing lure 100 includes a head 102 comprised of a cover 104 disposed over a central body 106. The head 102 includes a front end 118 that defines the front of the lure 100. In some examples, the cover 104 is removable and replaceable. The fishing lure 100 may also include an optional skirt 108 and/or an optional bait stabilizer 110. The fishing lure 100 is generally configured for trolling and providing a natural appearance of a baitfish attached to the fishing lure 100 when pulled through the water, for example, when trolling.

The cover 104 may be formed from an elastomer, such silicone, ethylene propylene diene monomer (EPDM), polyurethane, or other suitable material. the elastomeric material of the cover 104 allows one cover 104 to be removed from the central body 106 and replaced with another cover 104, for example, to change the color of the head 102. Alternatively, the cover 104 may be permanently affixed to the central body 106, for example, as a coating. The cover 104 may also include eyes 112 or other fish attracting effects or coloration. In the example depicted in FIG. 1, the cover 104 includes a cavity 120 sized to receive the central body 106.

The cover 104 has at least a first leader passage 114 exposed on a top surface of the cover 104. The first leader passage 114 has a diameter selected to allow a leader, for example a 150 lbs. monofilament leader having a diameter of approximately 0.05 in, to freely slide through the passage 114. It should be noted that in order for the lure 100 to function effectively as designed, the diameter of the first leader passage 114 must be significantly large enough so that the head 102 can freely slide alone the leader. Stated differently, the leader is not affixed in a manner that would prevent the head 102 from sliding along a leader passing through one of the leader passages of the head 102. The first leader passage 114 is offset from the front 118 of the head 102 in a direction towards the aft end of the central body 106. The cover 104 may optionally have a second leader passage 116 also formed through the top surface of the cover 104. The second leader passage 116 may be disposed further aft of the first leader passage 114 relative the front 118 of the head 102. The location of the first leader passage 114 on the top surface of the cover 104, and consequently the lure 100, prevents the lure 100 from wanting to spin, thus enabling the baitfish secured to the lure 100 to beneficially swim in a more naturally upright position, which significantly increases the probability of a strike from a predatory fish.

The central body 106 may be fabricated from lead, tin, bismuth, stainless steel, brass, ceramic, tungsten, tungsten-nickel alloy or other similar high density material. The central body 106 generally includes a front region 122 and a main region 124. The front region 122 may be substantially bullet shaped, conical, ellipsoidal, slant faced, cupped faced or have another geometric shape. The main region 124 may be larger than the front region 122. The central body 106 may also be keel-weighted, for example, having a center of gravity disposed below a longitudinal centerline 130 of the lure 100. In other examples, the central body 106 is not keel-weighted, for example, having the center of gravity interested by the longitudinal centerline 130 of the lure 100.

A notch 150 is formed in the top surface at least the main region 124 of the central body 106. The notch 150 is open to the first leader passage 114, and to the second leader passage 116 when present. The notch 150 may optionally extend into the front region 122 of the central body 106.

The central body 106 may optionally include an extension 126 that extends from the aft end of the main region 124 of the central body 106. The extension 126 may be formed as a unitary body with the central body 106, for example, in a single casting. The extension 126 includes a hole 128 formed therethrough that intersects or is otherwise open to the notch 150. The exterior surface of the extension 126 includes a forward slot 134 and an aft slot 136. The slots 134, 136 may be used to secure accessories to the lure 100, as later discussed below. The exterior surface of the extension 126 includes one or more key structures that allow accessories to be secured to the extension 126 in a predefined orientation. In one example, the exterior surface of the extension 126 may have a shape, such as a polygon, oval, and the like, that functions as a key structure that enables an accessory to be mounted to the extension 126 in a predefined orientation. In the example depicted in FIG. 1, the extension 126 includes key structures 132, 134 in the form of a groove that has a shape complimentary to a rib extending from the mating accessory.

For example, a skirt 108 may include a ring that contains a male key structure 142 that mates with the complimentary female key structures 132, 134. Alternatively, the female key structure 142 may be formed in the ring of the skirt 108 while the complimentary male key structures 132,134 may extend from the extension 126, thus enabling the skirt 108 to be rotationally fixed to the extension 126. The skirt 108 may be comprised of elongated filaments 140, such as hair, tentacles, strips of plastic or fabric, or other elongated element that adds attraction to the lure 102 when in use.

In one example, the skirt 108 may be replaceably slid on and off the extension 126, for example, to change the type or color scheme of the elongated filaments 140. In other example, the skirt 108 may be permanently affixed to the extension 126.

The optional stabilizer 130 may also be removably affixed to the extension 126. Various examples of the stabilizer 130 are further described below. It should be noted however, that the lure 100 may be fished without the presence of a stabilizer, for example, with a traditional pin rig on the leader.

Figure 2A:
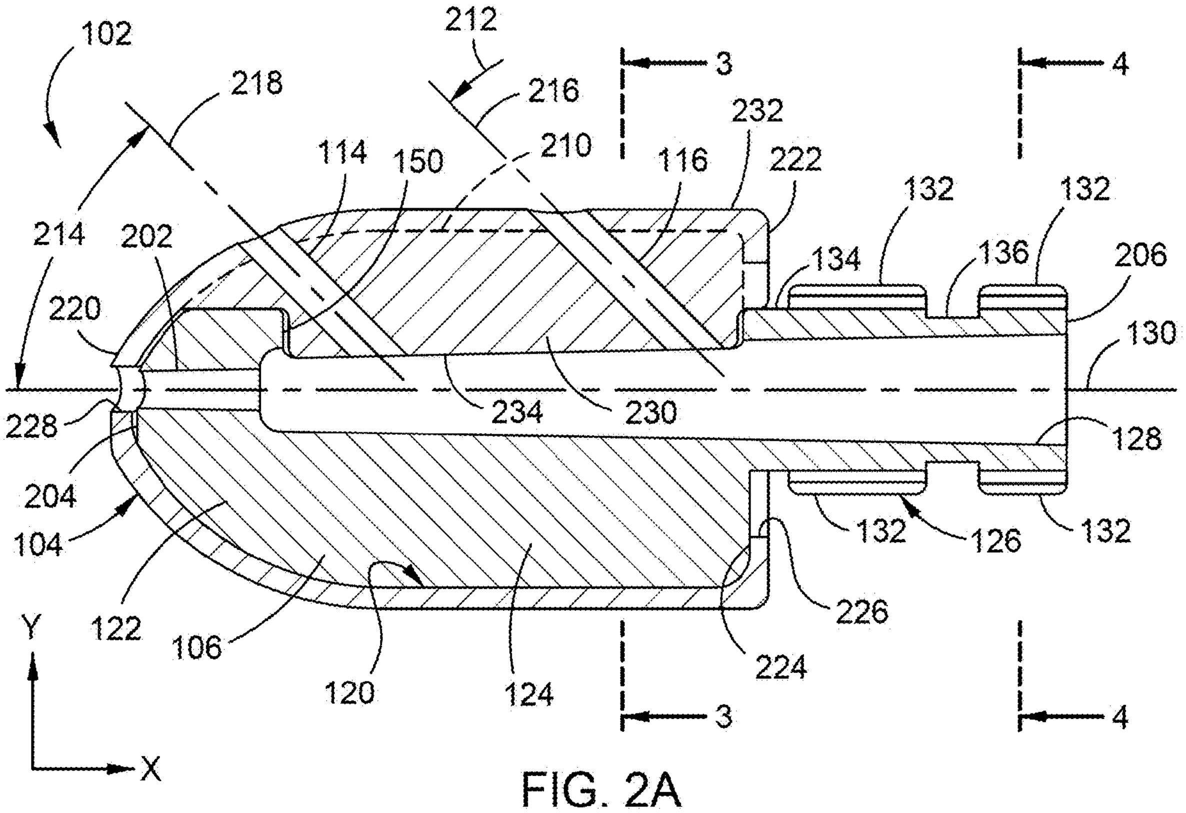
FIG. 2A is a sectional side view of a head of the fishing lure depicted in FIG. 1.

FIG. 2A is a sectional side view of the head 102 of the fishing lure depicted in FIG. 1. In FIG. 2A, the central body 106 and the extension 126 are more clearly illustrated. The central body 106 has a front end 204 that defines the front of the central body and extension assembly (i.e., front end 204 of the casting). The extension 126 has an aft end 206 that defines the aft of the central body and extension assembly (i.e., aft end 206 of the casting).

The central body 106 has a top surface 210 in which the notch 150 is formed. As stated above, the notch 150 extends into the main region 124 of the central body 106, and may optionally extend into the front region 122 of the central body 106. The notch 150 is open to the hole 128 formed through the extension 126. The hole 128 may be formed almost to the front end 204 of the central body 106. The centerline of the hole 128 also defines the centerline 130 of the central body 106, and thus the lure.

The front end 204 of the central body 106 may optionally include a center leader passage 202. The center leader passage 202 generally has a horizontal orientation, for example, being collinear or parallel to the centerline 130 of the central body 106. The center leader passage 202 is open to the hole 128 that exits the extension 126, such that a leader may be routed through the lure 100 in a horizontal direction. To utilize the center leader passage 202, an aligned center leader passage 228 is formed through a front 220 of the cover 104.

Figure 2B:
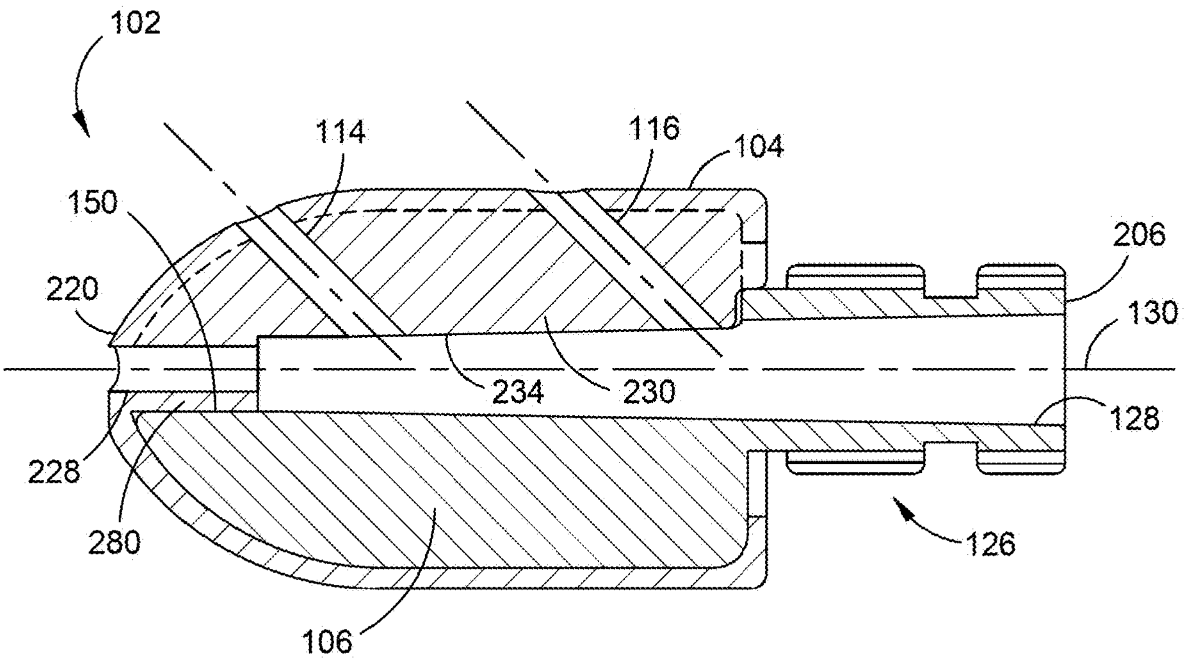
FIG. 2B is a sectional side view of another head that may be utilizing in the fishing lure depicted in FIG. 1.

Optionally, the notch 150 may extend below the centerline 130 of the central body 106 such that the center leader passage 228 formed through the front 220 of the cover 104 is open directly into the hole 128 in the central body 106 that exits the extension 126 as illustrated in FIG. 2B. In this manner, a leader routed through the lure 100 in a horizontal direction is protected from chafing on the central body 106 prior to entering the hole 128, advantageously decreasing the probability of line breakage while fighting a fish.

Continuing to refer to FIG. 2A, the cover 104 includes a tab 130 that extends from the top surface 232 of the cover 104 into the cavity 120 of the cover 104. The tab 130 also extends into the notch 150. A bottom surface of the tab 130 is exposed to the hole 128 extending into the central body 106 from the extension 126.

The first leader passage 114 is formed through the tab 140 of the cover 104. For example, the first leader passage 114 has a first opening that is exposed on the top surface 232 of the cover 104, and a second opening that is exposed on a bottom surface 234 of the tab 130 so that the first leader passage 114 is open directly to the hole 128 extending into the central body 106 from the extension 126. The first opening formed in the top surface 232 of the cover 104 is generally closer to the front end 220 of the cover 104 than the second opening formed through the bottom surface 234 of the tab 130. This geometry allows a leader routed through the first leader passage 114 to be protected from chafing on the central body 106 by the soft and resilient material of the cover 104 prior to entering the hole 128, advantageously decreasing the probability of line breakage while fighting a fish. In other words, routing the first leader passage 114 through the tab 140 of the cover 104 prevents a leader routed through the first leader passage 114 from chafing on the central body 106 of the head 102 as the leader changes direction within the central body 106 leaving the leader passage 114 and the entering the extension 126.

The first leader passage 114 has a centerline 118 extending therethrough. The centerline 118 of the first leader passage 114 forms an angle 214 that is greater than zero degrees and less than or equal to 90 degrees relative to the centerline 130 of the hole 128 formed in the central body 106. Stated differently, the centerlines 118, 130 intersect at an acute angle 214. In the example depicted in FIG. 2A, the first leader passage 114 forms an angle 214 of between 15 degrees and 75 degrees relative to the centerline 130 of the hole 128 formed in the central body 106. The angle 214 the first leader passage 114 and location of the first leader passage 114 on the top surface 232 of the cover 104 (and lure 100) promotes the lure 100 and baitfish secured thereto to be pulled through the water with a slightly downward orientation that substantially prevents the lure 100 from spinning, while also enhancing the swimming motion of the baitfish attached in an upright position, which significantly increases the probability of a strike from a predatory fish.

Similarly, the second leader passage 116 has a centerline 116 extending therethrough. The centerline 116 of the second leader passage 116 forms an angle 212 that is greater than zero degrees and less than or equal to 90 degrees relative to the centerline 130 of the hole 128 formed in the central body 106. Stated differently, the centerlines 116, 130 intersect at an acute angle 212. In the example depicted in FIG. 2A, the second leader passage 116 forms an angle 212 between 15 degrees and 75 degrees relative to the centerline 130 of the hole 128 formed in the central body 106. The location of the second leader passage 116 is closer to the aft end 222 of the cover 104 relative to the first leader passage 114. The farther back location of the second leader passage 116 results in the lure 100 taking a stepper angle when towed, causing the lure 100 to run deeper in the water column as compared to towing the lure 100 with a leader run through the first leader passage 114 or the center leader passage 228. As with the angle and top location of the first leader passage 114, use of the second leader passage 116 on the top surface 232 of the cover 104 (and lure 100) promotes the lure 100 and baitfish secured thereto to be pulled through the water substantially without spinning, while also advantageously enhancing the swimming motion of the baitfish secured to the lure.

While the head 102 depicted in FIG. 2A illustrates two leader passages 114, 116 disposed on the top surface 232 of the cover 104, the top surface 232 of the cover 104 may have only a single leader passage or more than two leader passages. Having multiple leader passages allows an angler to select the action of the lure 100 without having to switch lures, thus reducing the amount of lures needed to cover a wide variety of presentations. The center leader passage 228 may be present in addition to, as an alternative to, the leader passages formed through the top surface 232 of the cover to provide additional options for controlling the action of the lure 100.

As discussed above, the cover 104 may be removable from the central body 106. To retain the cover 104 over the central body 106, the cover 104 includes a lip 224 that extends inward towards the centerline 130 at the aft end 222 of the cover 104. The lip 224 terminates at an inside diameter wall 224 that is sized to allow the extension 126 to pass out from the cavity 120 of the cover 104.

Figure 3:
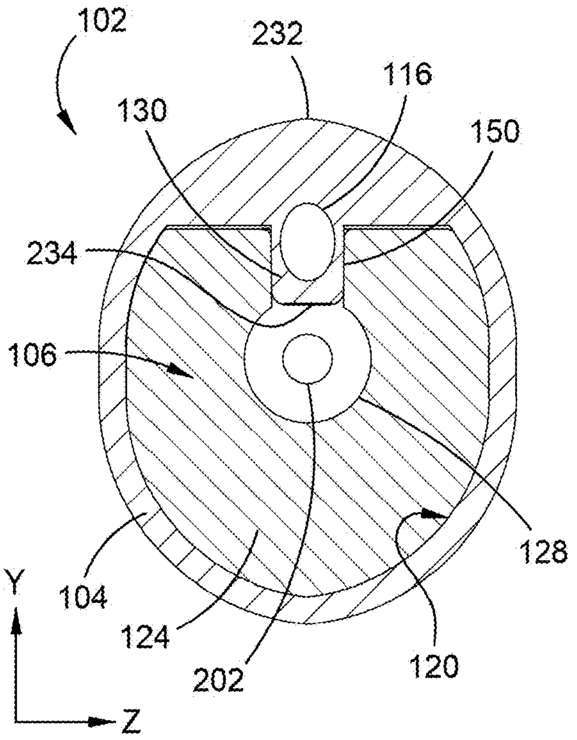
FIG. 3 is a sectional view of the head of the fishing lure taken along section line 3-3 depicted in FIG. 2A.

The cover 104 is secured in a predetermined orientation relative to the central body 106 by the insertion of the tab 130 of the cover 104 into the notch 150 of the central body 106, which is better illustrated in FIG. 3. FIG. 3 depicts a sectional view the head 102 of the fishing lure 100 taken along section line 3-3 depicted in FIG. 2A. Preventing the rotation of the cover 104 relative to the central body 106 ensures that the leader passages 114, 116 retain an orientation perpendicular to the centerline 130 (i.e., in the Y/X plane) so that the lure 100 repeatably maintains its performance catch after catch. Moreover, preventing the rotation of the cover 104 relative to the central body 106 also ensures that the eyes (112 illustrated in FIG. 1) remain correctly positioned.

Figure 3A:
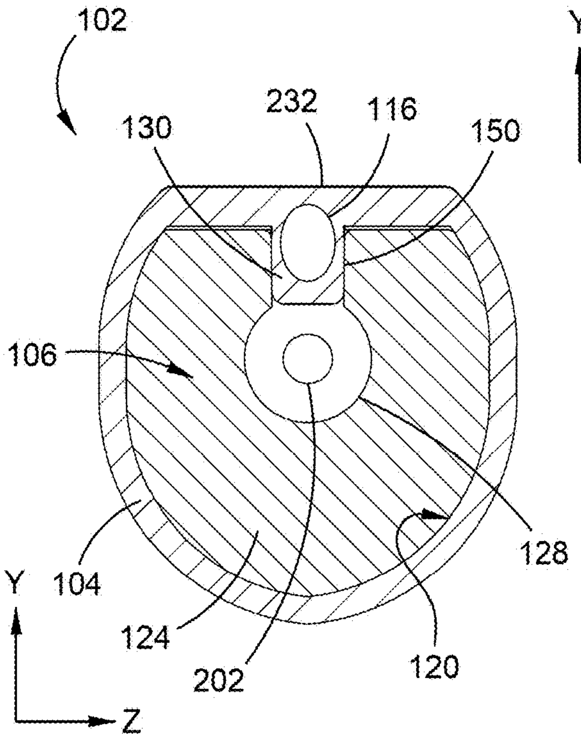
FIG. 3A is a sectional view of a variant of the head of the fishing lure depicted in FIG. 3.

FIG. 3A is a sectional view of a variant of the head 102 of the fishing lure 100 depicted in FIG. 3. In the variant of the head 102 depicted in FIG. 3A, the top surface 232, and consequently the lure 100, includes a flat section. The flat section of the top surface 232 may reside in a horizontal plane (X/Z plane) that is offset above and parallel to the centerline 130 of the central body 106. The flat section of the top surface 232 proves a diving plane that urges the lure deeper within the water column when trolled.

Figure 2C:
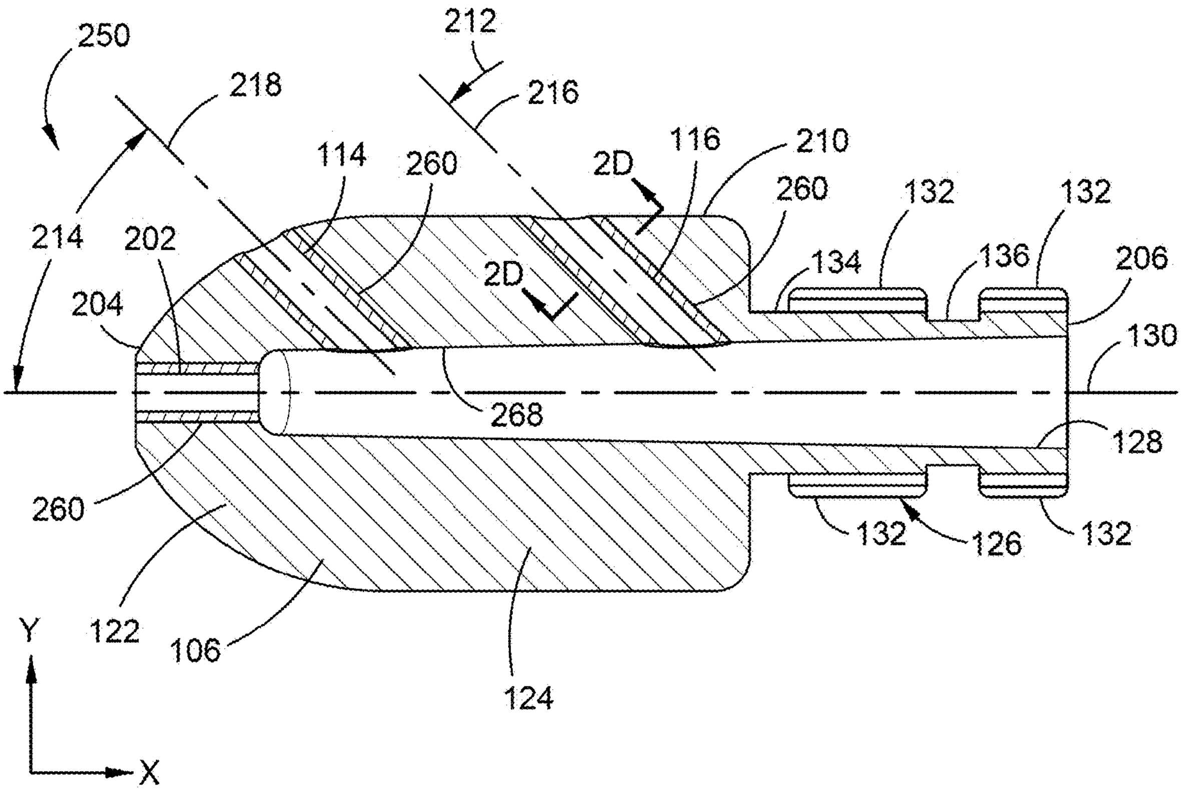
FIG. 2C is a sectional side view of another head that may be utilizing in the fishing lure depicted in FIG. 1.

FIG. 2C is a sectional side view of another head 250 that may be utilizing in the fishing lure 100 depicted in FIG. 1. The head 250 is generally the same as the head 102 described above, except in that the central body 106 of the head 250 may be optionally used without a cover 104. The central body 106 of the head 250 may be painted or otherwise coated to improve fish attraction and corrosion resistance. Since the head 250 does not need to interface with a cover 104, the head 250 does not need to have a notch 150. Rather, the top surface 210 of the head 250 is generally solid except for at least one or more of the passage 114, 116, 202, and the hole 128.

In some example, the first leader passage 114 includes an anti-chafing liner 260. The anti-chafing liner 260 is fabricated from a polymeric material, such as an elastomer or plastic. In one example, the anti-chafing liner 260 is fabricated from high-density polyethylene, ultra-high molecular weight polyethylene, silicone, ethylene propylene diene monomer (EPDM), polyurethane, or other suitable material. The second leader passage 116 and the optional center leader passage 202 may include anti-chafing liners 260.

Figure 2D:
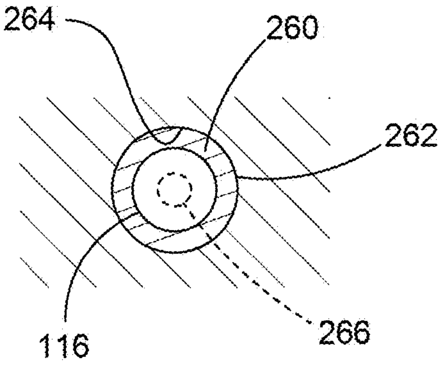
FIG. 2D is a sectional view of the head of the fishing lure taken along section line 2D-2D depicted in FIG. 2C.

A sectional view of the anti-chafing liner 260 disposed in the first leader passage 114 is illustrated in a sectional view of FIG. 2D which is taken along section line 2D-2D of FIG. 2C. In FIG. 2D, the anti-chafing liner 260 is shown disposed in the first leader passage 114. The anti-chafing liner 260 may be secured in the first leader passage 114 may any suitable technique, such as interference fit, threading, bonding, coating, and the like. In the example depicted in FIG. 2D, an outside diameter 262 of the anti-chafing liner 260 is bonded to an outside diameter sidewall 264 of the first leader passage 114 formed through the central body 102. An inside diameter of the anti-chafing liner 260 defines the outside diameter hole (i.e., the passage 114), which is sufficiently large enough to allow a leader (266 shown in phantom) to freely slide through the passage 114.

Returning to FIG. 2C, the anti-chafing liner 260 generally extends from the top surface 210 of the central body 106 to a sidewall (inside diameter) 268 of the hole 128. The anti-chafing liner 260 may optionally extend out from the first leader passage 114 beyond the sidewall 268 into the hole 128. The anti-chafing liner 260 extends the life of the leader passing through the head 250 by preventing direct contact between the leader and the central body 106, reducing leader brakeage when fighting a fish. Although use of the anti-chafing liner 260 within the leader passage significantly extends the life of the leader, the head 250 may alternatively be utilized without the anti-chafing liner 260.

Figure 4:
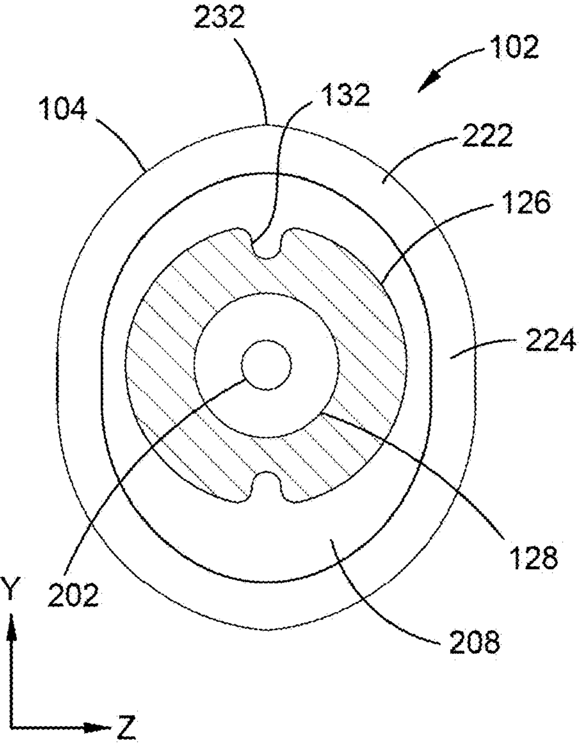
FIG. 4 is a sectional view of the head of the fishing lure taken along section line 4-4 depicted in FIG. 2A.

FIG. 4 is a sectional view of the head 102 of the fishing lure 100 taken along section line 4-4 depicted in FIG. 2A. In FIG. 4, the key structures 132 are illustrated formed in the extension 126 that mate with complimentary key features disposed on the accessories, such as the bait stabilizer 110 and/or skirt 108, as discussed above. In FIG. 4, the key structures 132 are illustrated as grooves configured to receive a complimentary shaped rib extending from the mating accessory. Alternatively, the key structures 132 of the extension 126 may be ribs configured to engage a complimentary shaped groove formed in the mating accessory. It is contemplated that the key structures may have any another geometry suitable for maintaining an accessory in a predefined rotational orientation relative to the extension 126.

Figure 5:
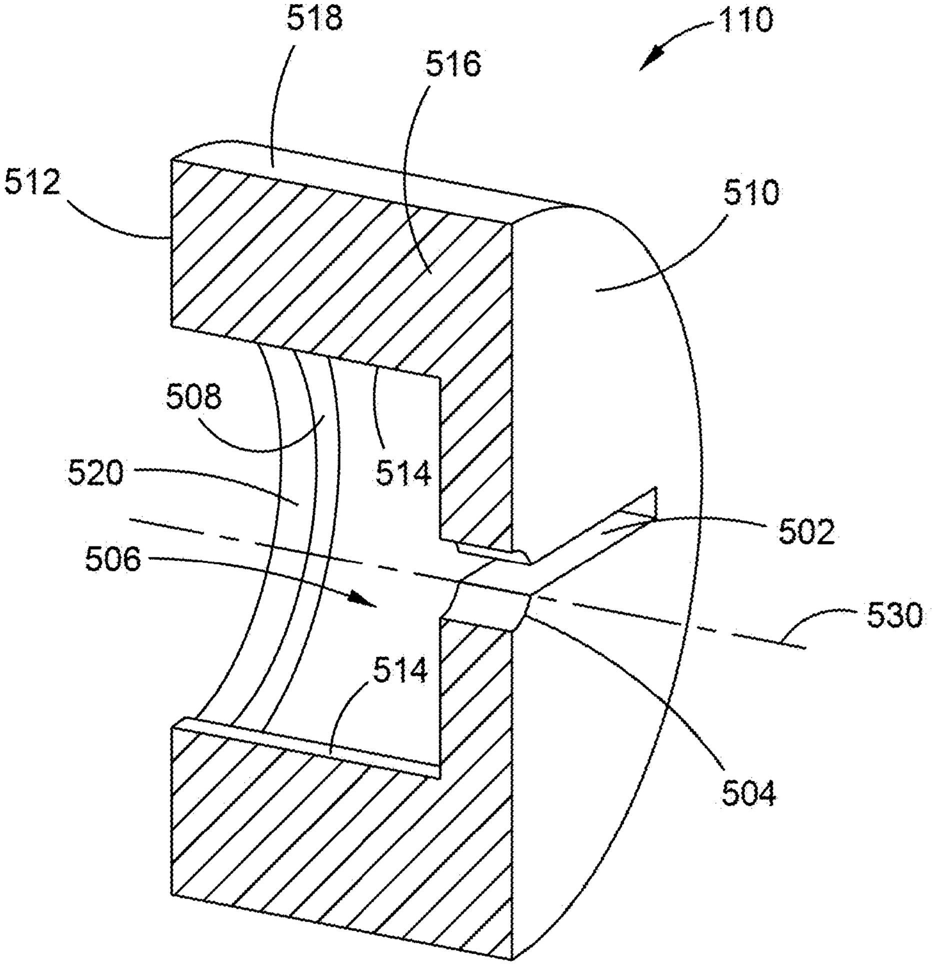
FIG. 5 is a side perspective sectional view of a bait stabilizer of the fishing lure depicted in FIG. 1.

FIG. 5 is a side perspective sectional view of the bait stabilizer 110 of the fishing lure 100 depicted in FIG. 1. The bait stabilizer 110 has a body 516 is made from a resilient material that enables the bait stabilizer 110 to snap onto the aft slot 136 of the extension 126. The body 516 may be fabricated from polymeric material, such as a plastic or an elastomer. The body 516 may be fabricated from silicone, ethylene propylene diene monomer (EPDM), polyurethane, or other suitable material. The bait stabilizer 110 may be used to retain (i.e., capture) the skirt 108 on the extension 126. The bait stabilizer 110 includes a cavity 506 formed in a front portion of the body 516 that accepts the extension 126. The cavity 506 includes a snap fit mechanism which is comprised of a lip 508 that extends into the cavity 506 towards a centerline 530 of the bait stabilizer 110. The centerline 530 of the bait stabilizer 110 is aligned in the same direction or collinear with the centerline of the cavity 506. When the bait stabilizer 110 is attached to the extension 126, the centerline 530 of the bait stabilizer 110 is parallel to, or collinear with, the centerline 130 of the central body 106 that extends through the hole 128 formed in the extension 126. The lip 508 includes an inner diameter 520 that is large enough to stretch over the extension 126, and small enough to allow the lip 508 to snap into the aft slot 136 of the extension 126, thereby securing the stabilizer 110 to the extension 126. Alternatively, the front portion of the body 516 may include connecting structures other than the snap fit mechanism, such as a detent mechanism, a quarter turn mechanism, threads, or other suitable type of connector that allows the bait stabilizer 110 to be removably secured to the head 102 of the lure 100, Key structures 514 extend into the cavity 506. In FIG. 5, the key structures 514 are illustrated as ribs that that mate with the complimentary female key structures 132 formed in the extension 126. Alternatively, the key structures 514 of the bait stabilizer 110 may be grooves configured to engage a complimentary shaped rib formed in the mating key structure 132 of the extension 126. It is contemplated that the key structures may have another geometry suitable for maintaining the bait stabilizer 110 in a predefined rotational orientation relative to the extension 126.

The bait stabilizer 110 includes a slot 502 and a leader passage 504. The leader passage 504 is formed on the centerline 530 of the bait stabilizer 110. The leader passage 504 passes through the middle of the slot 502. The slot 502 generally extends towards the outer surface 518 of the bait stabilizer 110. The key structures 514 of the bait stabilizer 110 hold the orientation of the bait stabilizer 110 relative to the central body 106 and cover 104 such that the slot 502 remains oriented in a horizontal plane (i.e., the X/Z plane) that is also perpendicular to the orientation of the notch 150 and the tab 230. In this orientation, baitfish such as ballyhoo which have a bill can be held in an upright position by inserting the bill into the slot 502 of the bait stabilizer 110. The slot 502 also provides an edge that prevents non-billed baitfish from rotating relative to the bait stabilizer 110.

In use, a leader is run through one of the leader passages formed in the head 102 and out the aft end of the extension 126. A skirt 108 is secured to the extension 126 by the bait stabilizer 110. The leader is run out of the lure 102 through the leader passage 504 formed through the bait stabilizer 110 and out the rear portion of the stabilizer. A hook is crimped to the leader, and a ballyhoo or other baitfish is secured to the hook. The bill of the ballyhoo, with hook disposed therein, is slid into the slot 502 of the bait stabilizer 110 so that the ballyhoo is secured in an upright orientation relative to the lure 102. At this point, the lure 100 with baitfish is ready to be deployed behind a vessel. If use of a bait stabilizer 110 and baitfish is not desired, a tail may be snapped onto the extension 126 of the lure 102.

Figure 6:
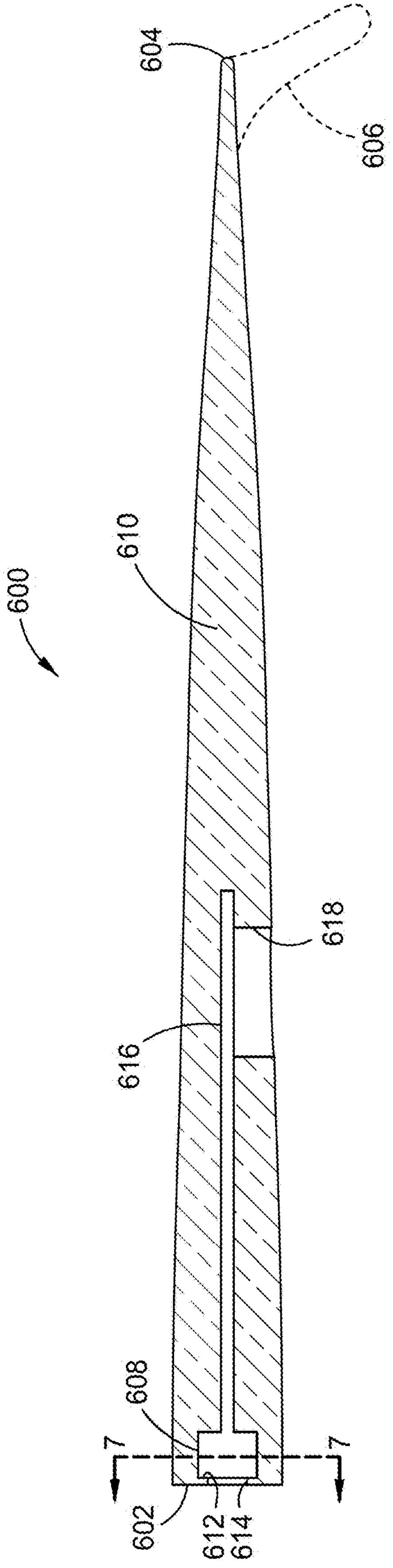
FIG. 6 is a sectional view of one example of a tail that can be utilized with the fishing lure depicted in FIG. 1 in place of a bait stabilizer.

FIG. 6 is a sectional view of one example of a tail 600 that can be utilized with the fishing lure 100 depicted in FIG. 1 in place of a bait stabilizer. The tail 600 includes an elongated body 610. The body 610 extends from a front end 602 to an aft end 604. The aft end 604 may optionally include a paddle tail 606 (shown in phantom). The body 610 of the tail 600 is generally fabricated from a polymer. In one example, the body 610 of the tail 600 is fabricated from an elastomer, such silicone, ethylene propylene diene monomer (EPDM), polyurethane, or other suitable material.

The body 610 of the tail 600 includes a cavity 608 that accepts the extension 126. The cavity 608 includes a snap fit mechanism which is similar to that of the bait stabilizer 110. The body 610 of the tail 600 includes a lip 612 that extends into the cavity 608 towards a centerline of the tall 600. The lip 612 includes an inner diameter 614 that is large enough to stretch over the extension 126, and small enough to allow the lip 612 to snap into the forward slot 134 of the extension 126. The snap first mechanism allows the tail 600 to be easily attached and replaced from the central body 106, for example, if damaged by a fish strike, or if a change of the color or style of the tail 600 is desirable.

Figure 7:
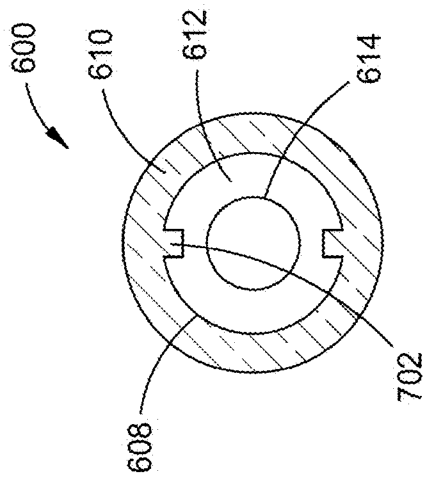
FIG. 7 is a sectional view of the tail taken along section line 7-7 depicted in FIG. 6.

Referring additionally to the sectional view of FIG. 7, key structures 702 extend into the cavity 608. In FIG. 7, the key structures 702 are illustrated as ribs that that mate with the complimentary key features 132 formed in the extension 126. Alternatively, the key structures 702 of the tail 600 may be grooves configured to engage a complimentary shaped rib formed in the mating key structure 132 of the extension 126. It is contemplated that the key structures may have another geometry suitable for maintaining the tall 600 in a predefined orientation relative to the extension 126.

Referring back to FIG. 6, the tail 600 includes a molded hook cavity 616 and an exit slot 618 for the hook. The molded hook cavity 616 is open to the cavity 608 that snap fits to the extension 126. The molded hook cavity 616 extends from the cavity 608 within the body 610 toward the aft end 604 of the tall 600. The exit slot 618 is open to the molded hook cavity 616 and exits outer surface of the body 610 so that the point of the hook is exposed to increase the probability of a hook-up when a fish strikes the lure 100.

Figure 8:
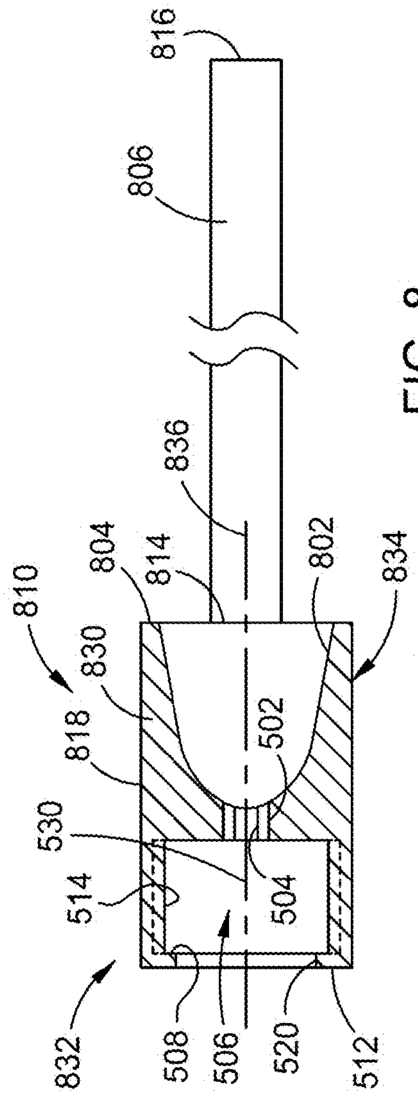
FIG. 8 is a side sectional view of another example of a bait stabilizer that can be utilized with the fishing lure depicted in FIG. 1.

FIG. 8 is a side sectional view of another example of a bait stabilizer 810 that can be utilized with the fishing lure 100 depicted in FIG. 1. The bait stabilizer 810 not only maintains the baitfish in an upright position, but also secures the baitfish to the lure 100 without need for additional rigging materials, such as copper wire or rigging floss.

The bait stabilizer 810 includes a body 808 having a slot 502 and a leader passage 504 formed therein. The body 808 is made from a resilient materials suitable for fabricating the bait stabilizer 110 described above. The body 808 includes a front portion 832 and a rear portion 834. The front portion 832 is adapted to connect to the extension 126 of the central body 106 of the head 102. The rear portion 834 is adapted to secure and orient the baitfish to the body 808 of the bait stabilizer 810, and consequently, to the extension 126 of the central body 106 of the head 102.

The front portion 832 is configured similar to the bait stabilizer 110 illustrated in FIG. 5. The front portion 832 of the bait stabilizer 810 includes connecting structure configured to removably connect with a head of a fishing lure, such as described above. In the example depicted in FIG. 5, the front portion 832 of the bait stabilizer 810 includes. a cavity 506 that accepts the extension 126. The cavity 506 includes a snap fit mechanism which is comprised of a lip 508 that extends into the cavity 506 towards a centerline 836 of the bait stabilizer 810. The centerline 836 of the bait stabilizer 810 is also the centerline of the cavity 506. When the bait stabilizer 810 is attached to the extension 126, the centerline 836 of the bait stabilizer 810 is parallel to, or collinear with, the centerline 130 of the central body 106 that extends through the hole 128 formed in the extension 126. The lip 508 includes an inner diameter 520 that is large enough to stretch over the extension 126, and small enough to allow the lip 508 to snap into the aft slot 136 of the extension 126.

Key structures 514 extend into the cavity 506. In FIG. 8, the key structures 514 are illustrated as ribs that that mate with the complimentary key features 132 formed in the extension 126. Alternatively, the key structures 514 of the bait stabilizer 810 may be grooves configured to engage a complimentary shaped rib formed in the mating key structure 132 of the extension 126. It is contemplated that the key structures may have another geometry suitable for maintaining the bait stabilizer 810 in a predefined orientation relative to the extension 126. The key structures 514 of the bait stabilizer 810 generally are arranged such that a top surface of the bait stabilizer 810 aligns with the top surface 232 of the cover 104, ensuring that the slot 502 of the bait stabilizer 810 is maintained in a horizontal plane.

The bait stabilizer 810 also includes a slot 502 and a leader passage 504. The slot 502 and the leader passage 504 generally extend between the front portion 832 and the rear portion 834 of the body 808. At least the leader passage 504 is open to the cavity 506.

The rear portion 834 of the body 808 includes a baitfish receiving cavity 802 that is open to the aft end 804 of the bait stabilizer 810. The baitfish receiving cavity 802 may have a cylindrical shape, a conical shape, a hemispherical shape, a semi-ovoidal shape, a semi-ellipsoidal shape, or other suitable shape. The slot 502 and the leader passage 504 are open to the baitfish receiving cavity 802. As such, at least the leader passage 504 connects the cavity 506 formed in the front portion 832 with the baitfish receiving cavity 802 formed in the rear portion 834 of the body 808 of the bait stabilizer 810.

In the example depicted in FIG. 8, the front and rear portions 832, 834 of the bait stabilizer 810 are aligned such that the cavities 506, 802 share a common centerline 836. As such, an outer surface 818 of the front portion 832 is also shared with the rear portion 834 of the bait stabilizer 810, thus allowing a leader to pass through the stabilizer 810.

The bait stabilizer 810 also includes a strap 806. The strap 806 is utilized to secure a head of the baitfish within the baitfish receiving cavity 802. The strap 806 has a proximal end 814 that is connected to the body 808 of the bait stabilizer 810. In one example, the proximal end 814 of the strap 806 is coupled to the rear portion 834 of the body 808. The strap 806 extends from the rear portion 834 of the body 808 to a distal end 816. The strap 806 may be fabricated from the same or different material than the material used to fabricate the body 808.

Figure 9:
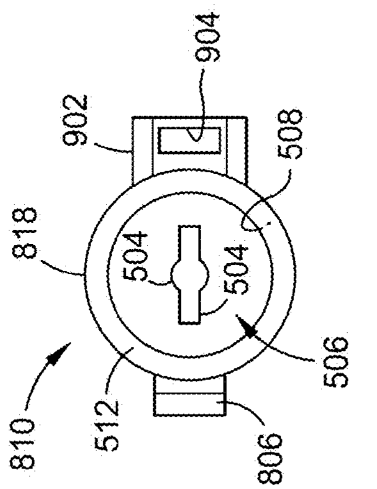
FIG. 9 is a side view of the bait stabilizer depicted in FIG. 8.
Figure 10:
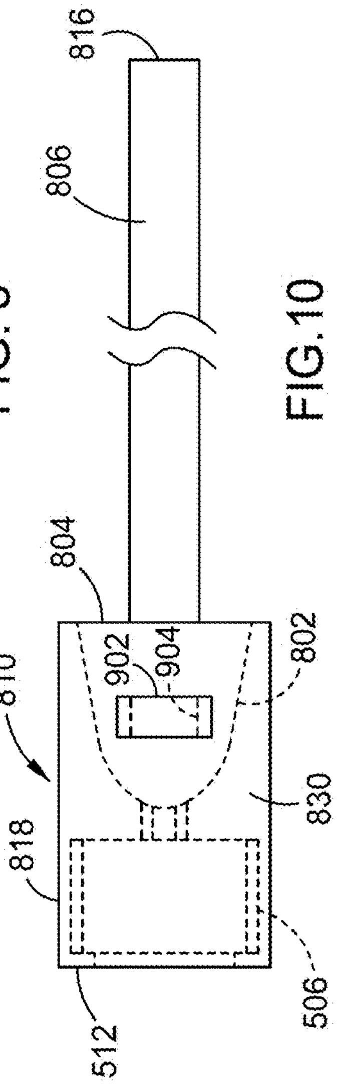
FIG. 10 is a front side view of the bait stabilizer depicted in FIG. 8.
Figure 12:
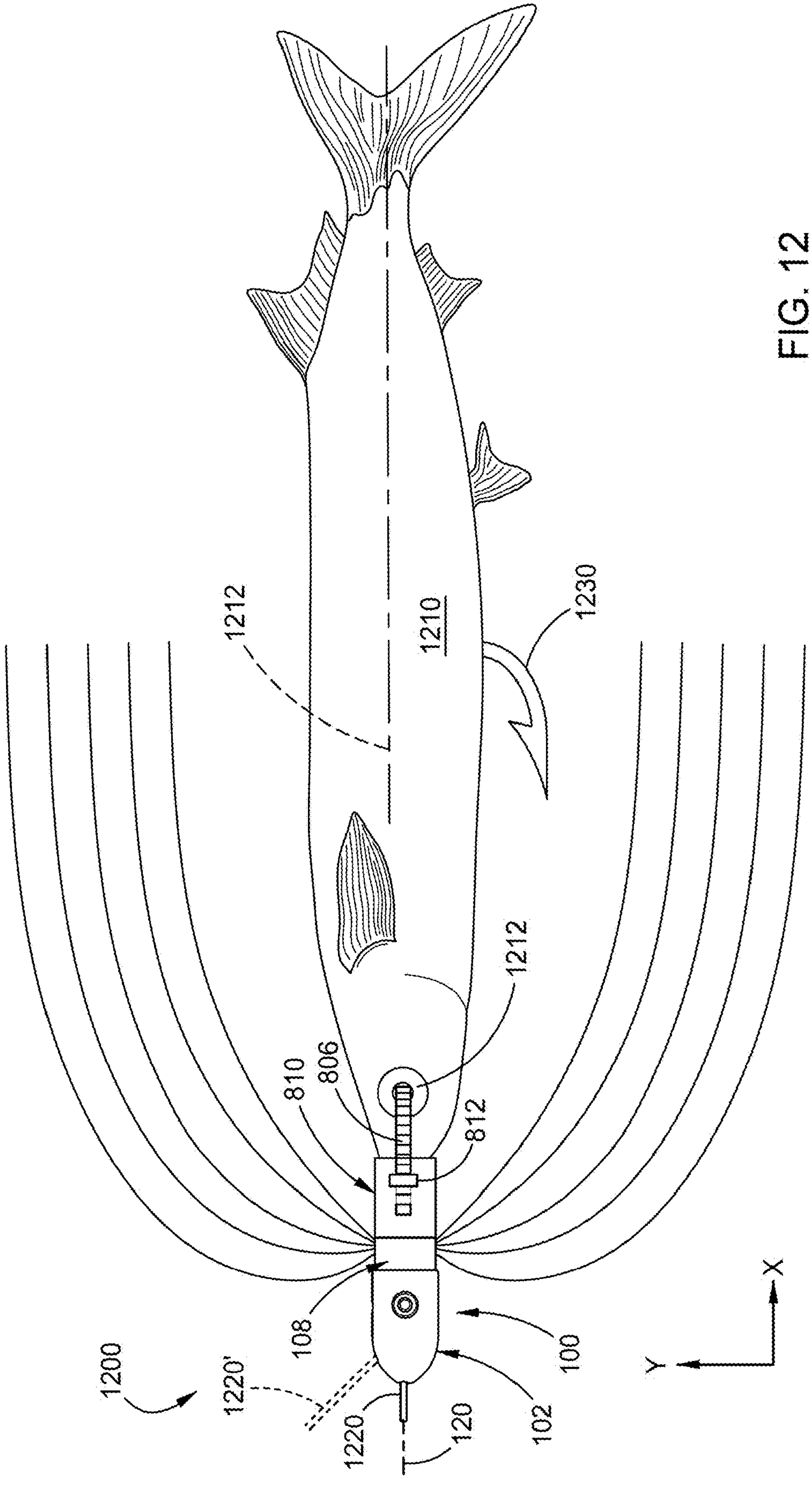
FIG. 12 is a side view of a lure rigged with a baitfish using the bait stabilizer depicted in FIG. 8.

FIG. 9 is a side view of the bait stabilizer 810 depicted in FIG. 8. In FIG. 9, the horizontal orientation of the slot 502 is illustrated. One end of the slot 502 is proximate the strap 806, while the opposite end of the slot 502 disposed on the other side of the leader passage 504 is proximate a catch 902 positioned on the exterior surface 818 of the bait stabilizer 810 (as also seen in the front view of the bait stabilizer 810 depicted in FIG. 10). In use (and as depicted in FIG. 12), the strap 806 is passed through a portion of the baitfish, such as the eye sockets, and engaged with the catch 902, thereby securing the baitfish to the body 808. The catch 902 is configured to secure the distal end 816 or other portion of the strap 806 to the body 808. When securing the baitfish to the body 808, the head of the baitfish is pressed into the baitfish receiving cavity 802. For baitfish having bills, the bill is slid into the slot 502 such that the baitfish is held in an upright position by the bait stabilizer 810.

Figure 11:
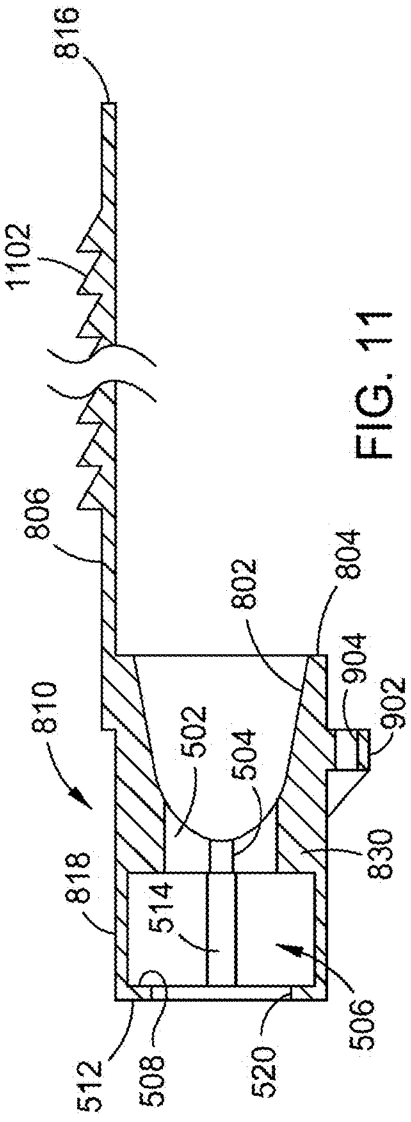
FIG. 11 is a top sectional view of the bait stabilizer depicted in FIG. 8.

FIG. 11 is a top sectional view of the bait stabilizer 810 depicted in FIG. 8, providing additional details about the strap 808. In the embodiment depicted in FIG. 11, the strap 808 includes teeth 1102. The teeth 1102 may be disposed on one or more sides of the strap 808. The teeth 1102 may be ridges, triangles, pyramids or other shape that is retained by the catch 902 after the strap 808 has been tensioned by pulling through the aperture 904 of the catch 902. In some examples, the teeth 1102 and/or catch 902 may be configured such that the strap 808 may be easily pulled through the aperture 904 in only one direction. In that manner, the strap 806 and catch 902 function simulates a zip-tie. In other examples, the catch 902 may be a latch, buckle, clamp or other mechanism for securing the strap 808 to the bait stabilizer 810.

As noted above, FIG. 12 is a side view of a lure 1200 rigged with a baitfish 1210 using the bait stabilizer 810 depicted in FIG. 8. The lure 1200 is constructed essentially the same as the lure 100, and includes a head 102 that has a leader 1220 routed through the center leader passage 202. Alternatively, the leader, such as shown in phantom by leader passages 1220', may be routed out a leader passage (such as one of the passages 114, 116) formed in a top surface of the head 102. The lure 1200 shown in FIG. 12 includes a skirt 108 retained to the head 102 by the bait stabilizer 810. The head of the baitfish 1210 is held in the baitfish receiving cavity 802 by the strap 806. The strap 806 is routed through the eye sockets of the baitfish 1210 and engaged with the catch 902 to secure the baitfish 1210 to the bait stabilizer 810. Any excess portion of the strap 802 that extends beyond the catch 902 after the baitfish 1210 is secured may be trimmed off. For baitfish 1210 having bills such as the ballyhoo depicted in FIG. 12, the bill of the baitfish is slid into the horizontally oriented slot 502 of the bait stabilizer 810 so that the baitfish 810 is held in an upright position that promotes life-like swimming motion.

The leader 1220 generally passes through the lure 1200 and out the baitfish stabilizer 810. The end of the leader 1220 is secured to a hook 1230, for example with a knot or crimp. The hook 1230 is positioned in the baitfish 1210 such that the barb is exposed out the bottom of the baitfish 1210.

In the example depicted in FIG. 12, the general centerline 1212 of the baitfish 1210 is generally collinear or parallel with the centerline 120 of the head 102. In other examples, the front and rear portions of the bait stabilizer may be disposed at an acute angle such that the centerline 1212 of the baitfish 1210 is also disposed at angle less than 180 degrees with the centerline 120 of the head 102.

Figures 13, 14, 15:
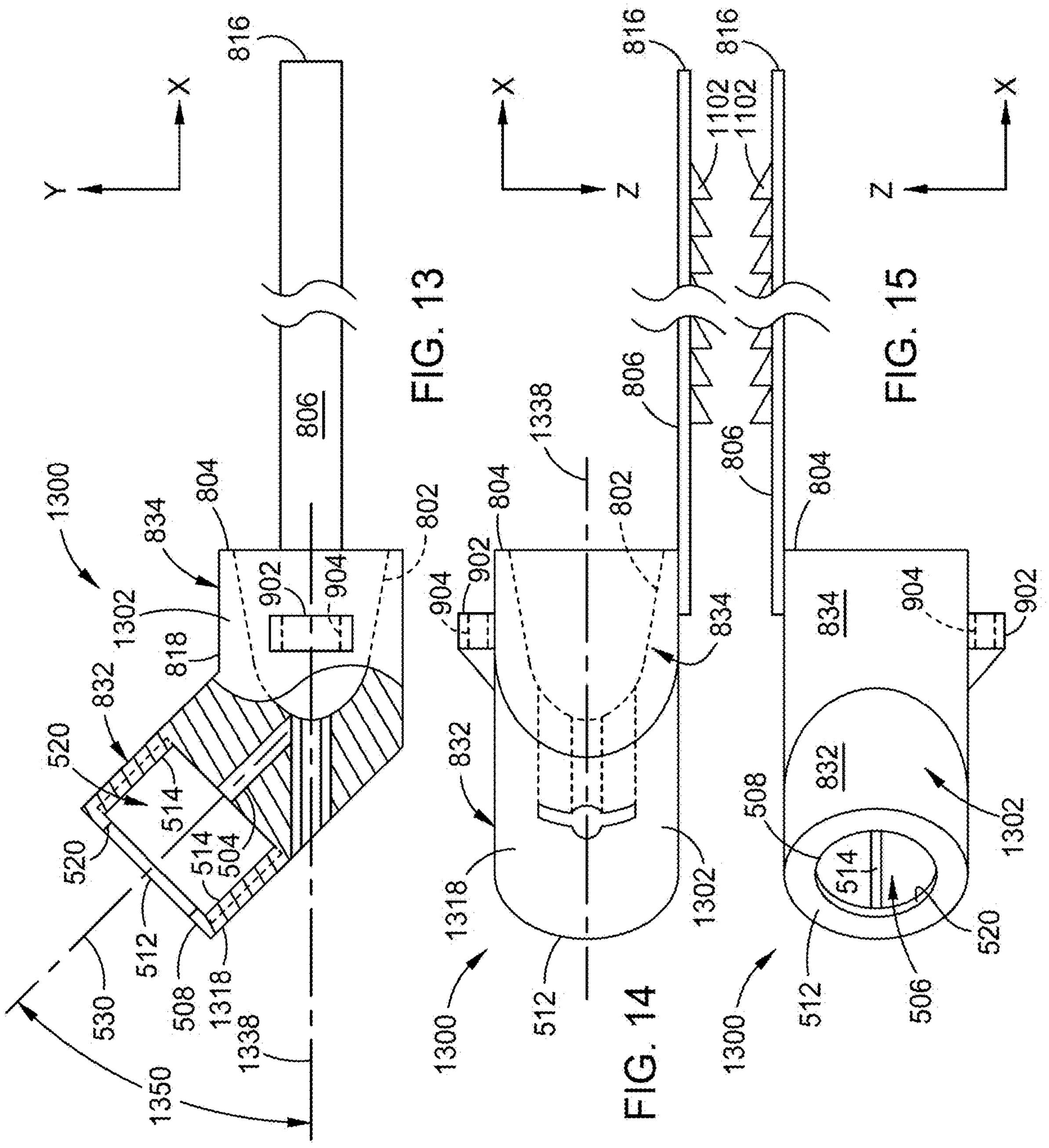
FIG. 13 is a side cutaway sectional view of another example of a bait stabilizer that can be utilized with the fishing lure depicted in FIG. 1.
FIG. 14 is a bottom view of the bait stabilizer depicted in FIG. 13.
FIG. 15 is a top view of the bait stabilizer depicted in FIG. 13.

For example, FIG. 13 is a side cutaway sectional view of an example of a bait stabilizer 1300 that can be utilized with the fishing lure 100, 1200 depicted in FIGS. 1 and 12, among other lures. FIGS. 14 and 15 are a bottom and top views of the bait stabilizer 1300 depicted in FIG. 13. Referring collectively to FIGS. 13, 14 and 15, the bait stabilizer 1300 is constructed essentially the same as the bait stabilizer 810, except that the front portion 832 and the rear portion 834 of the body 1302 of the bait stabilizer 1300 are not linearly aligned. For example, a centerline of the front portion 832 and the centerline of the rear portion are not linearly aligned such that the centerlines are disposed at angle less than 180 degrees. In the example depicted in FIG. 13, the cavity 506 formed in the front portion 832 has a centerline 530 that intersects a centerline 1338 of the baitfish receiving cavity 802 at an angle 1350. The angle 1350 may be less than 180 greater but greater than 105 degrees, such as between about 170 degrees and 120 degrees. The angle 1350 between the front and read portions 832, 834 of the bait stabilizer 1300 enhances the swimming motion of the baitfish, while also reducing the tendency of the baitfish to spin.

Alternatively, in any of the above examples, the strap 806 and catch 902 may be directly connected to opposite sides of the central body 106 or the cover 104. The proximal end 814 of strap 806 may be directly connected to the central body 106 or the cover 104, for example, using a button, fastener, peening, interference fit, adhesive or other suitable technique. The catch 902 is coupled to or integrated with the central body 106 or the cover 104. Thus, the distal end 816 of the strap 802 may be engaged with the catch 902 to secure a baitfish to the central body 106 (or cover 104 disposed over the central body 106) with or without the use of an intervening bait stabilizer.

While the foregoing is directed to embodiments of the present invention, other and further embodiments of the invention may be devised without departing from the basic scope thereof, and the scope thereof is determined by the claims that follow

What is claimed is:

1. A fishing lure comprising:

a central body comprising:

a front region and a main region;

a notch formed in a top surface of the central body; and a hole disposed in the central body passing through an aft end of the main region, the notch open to the hole; and a cover disposed over the central body, the cover formed from an elastomer and comprising:

a tab extending into the notch formed in the central body; and a first leader passage formed through the tab, the first leader passage exiting a top exterior surface of the cover and the tab, the first leader passage open to the hole formed in the central body.

2. The lure of claim 1, wherein the first leader passage forms an angle greater than zero degrees and less than or equal to 90 degrees relative to a centerline of the hole formed in the central body.

3. The lure of claim 1, wherein the first leader passage forms an angle of between 15 degrees and 75 degrees relative to a centerline of the hole formed in the central body.

4. The lure of claim 1, wherein the cover further comprises:

a second leader passage formed through the tab, the second leader passage exiting a top exterior surface of the cover and the tab, open to the hole formed in the central body, the second leader passage disposed at an angle greater than zero degrees and less than or equal to 90 degrees relative to a centerline of the hole formed in the central body.

5. The lure of claim 1, wherein the cover further comprises:

a center hole formed in a front of the cover that is open to the hole formed in the central body via a leader hole formed in a front section of the central body.

6. The lure of claim 1, wherein the head is keel weighted.

7. The lure of claim 1, wherein the head is fabricated from stainless steel, brass, lead or tungsten.

8. The lure of claim 1, wherein the central body further comprising:

an extension extending from an aft end of the main region, the hole in the central body extending through the extensions.

9. The lure of claim 8 further comprising:

a skirt disposed around the extension.

10. The lure of claim 1 further comprising:

a tail coupled to the aft end of the main region.

11. The lure of claim 1 further comprising:

a bait stabilizer coupled to the aft end of the main region, the bait stabilizer having a slot extending horizontally;

a strap coupled to a side of the bait stabilizer proximate a first end of the slot; and a catch operable to secure the strap to a side of a side of the bait stabilizer proximate a second end of the slot.

12. The lure of claim 1 further comprising:

a bait stabilizer having a first cavity and a second cavity, the first cavity configured to connect with the main section of the head, the second cavity having a baitfish receiving cavity, the baitfish receiving cavity having a slot extending horizontally, the baitfish receiving cavity connected to each other by a passage.

13. The lure of claim 12, wherein the first cavity has a centerline that intersects a centerline of the second cavity at an acute angle.

14. The lure of claim 12, wherein the central body is keel weighted.

15. A fishing lure comprising:

a hookless central body comprising:

a front region and a main region;

an extension extending from an aft end of the central body;

a notch formed in a top surface of the central body; and a hole through the extension and into the main region of the central body, the notch open to the hole;

a skirt disposed around the extension; and a cover disposed over the central body, the cover formed from an elastomer material, the cover having a first leader passage bounded by the elastomer material of the cover, the first leader passage formed through a top exterior surface of the cover exiting an interior surface of the cover directly into the hole in the central body without passing through a leader hole formed in the central body.

16. The lure of claim 15, wherein the first leader passage forms an angle between about 30 degrees and about 75 degrees relative to a centerline of the hole formed in the central body.

17. The lure of claim 15, wherein the cover has a lip that removably captures the central body within the cover.

18. The lure of claim 15, wherein the cover further comprises:

a center hole formed in a front of the cover that is open to the hole formed in the central body via a leader hole formed in a front section of the central body.

* * * * *